Oct. 21, 1969    J. BOYCE    3,473,613
TOMATO HARVESTER
Filed April 26, 1967    5 Sheets-Sheet 1
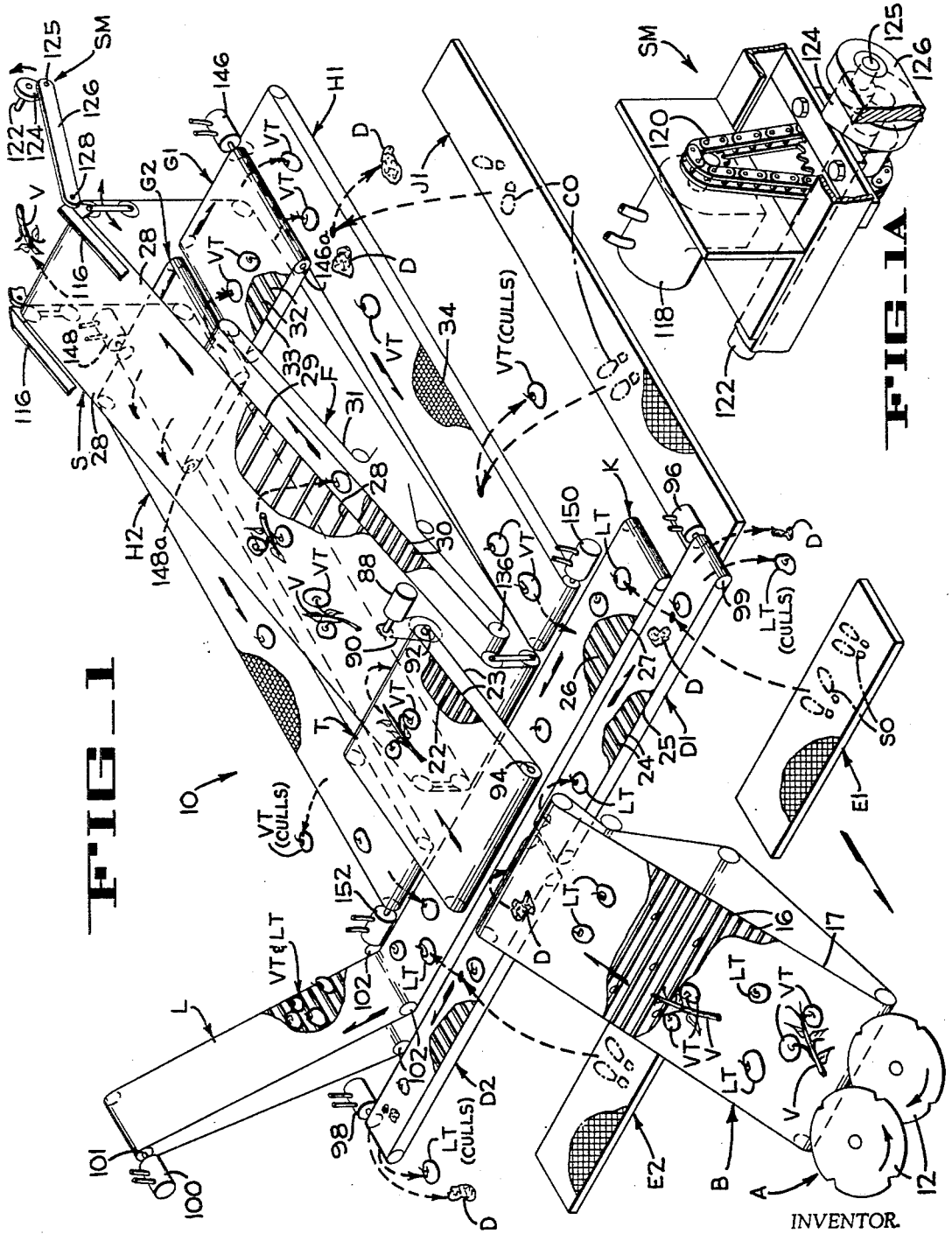
INVENTOR.
JOHN BOYCE
BY
Francis W. Anderson
ATTORNEY

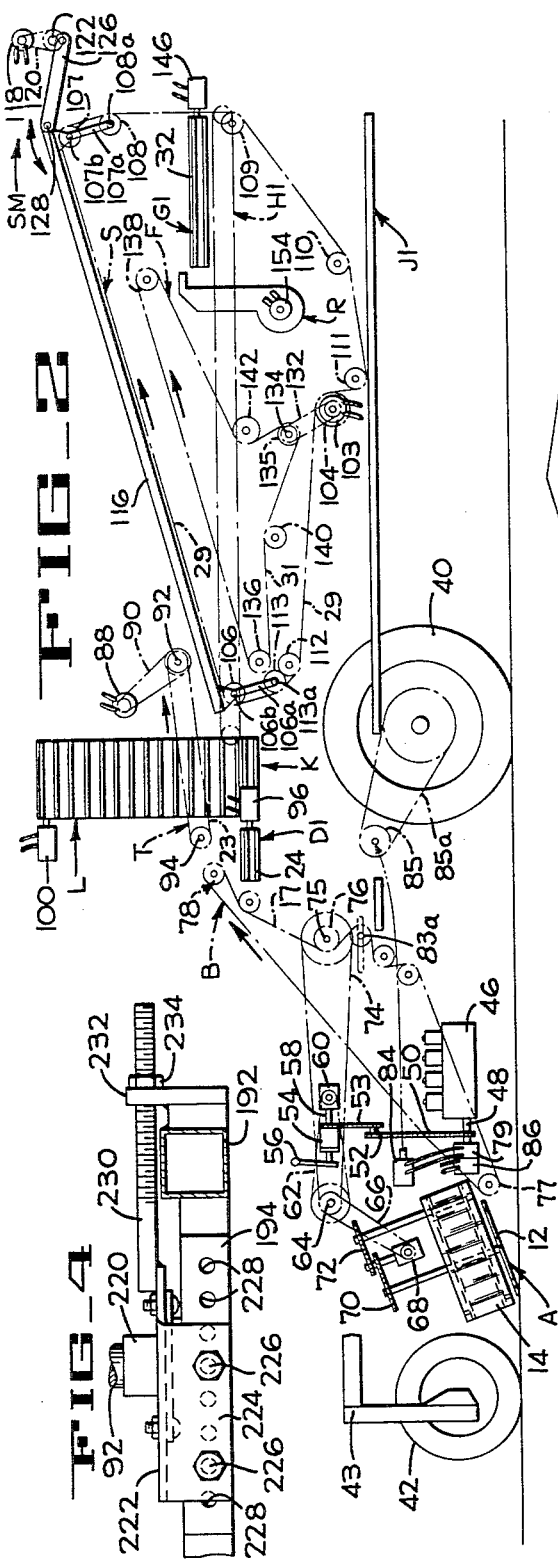
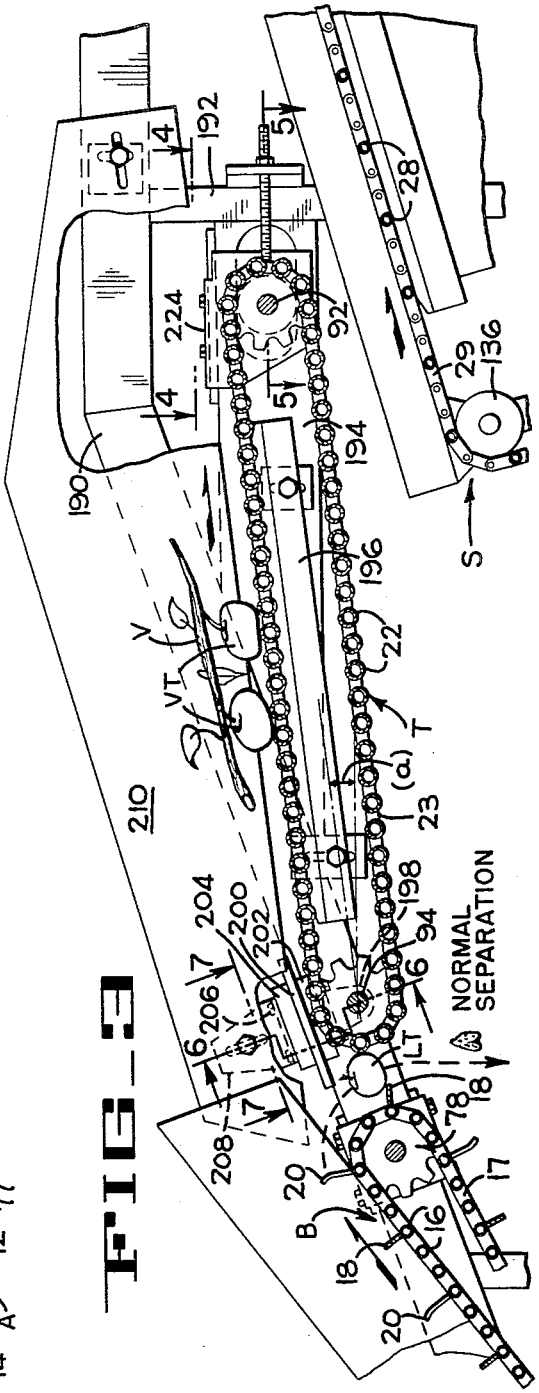

Oct. 21, 1969 J. BOYCE 3,473,613
TOMATO HARVESTER
Filed April 26, 1967 5 Sheets-Sheet 3
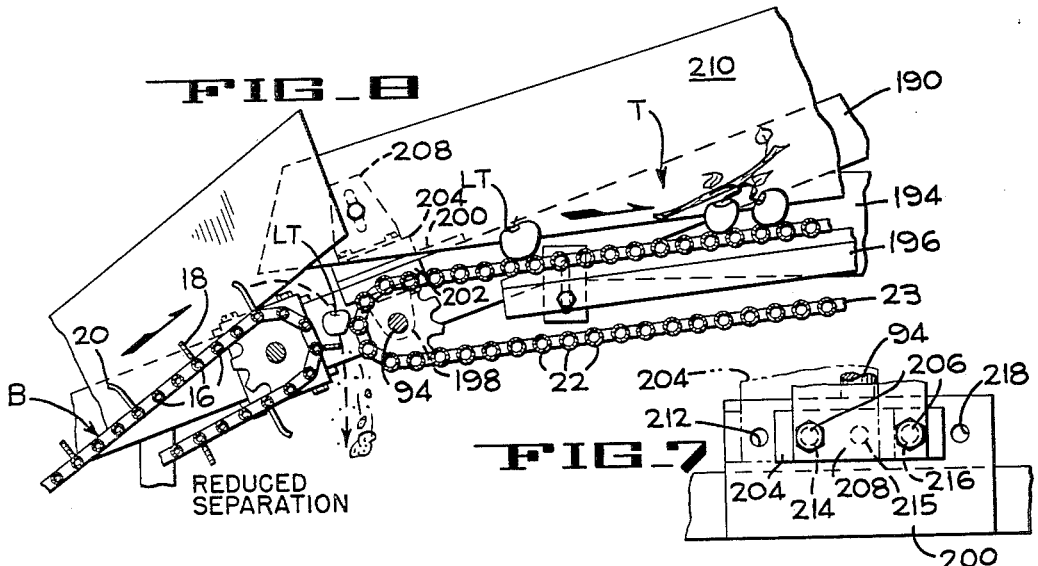
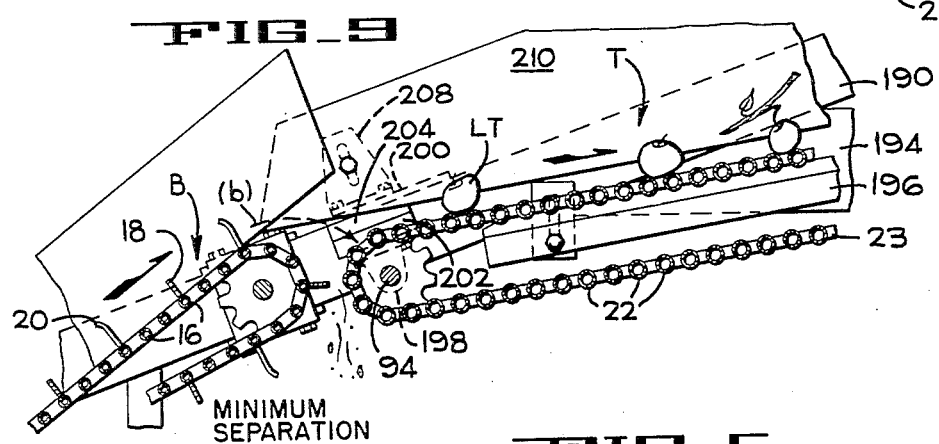
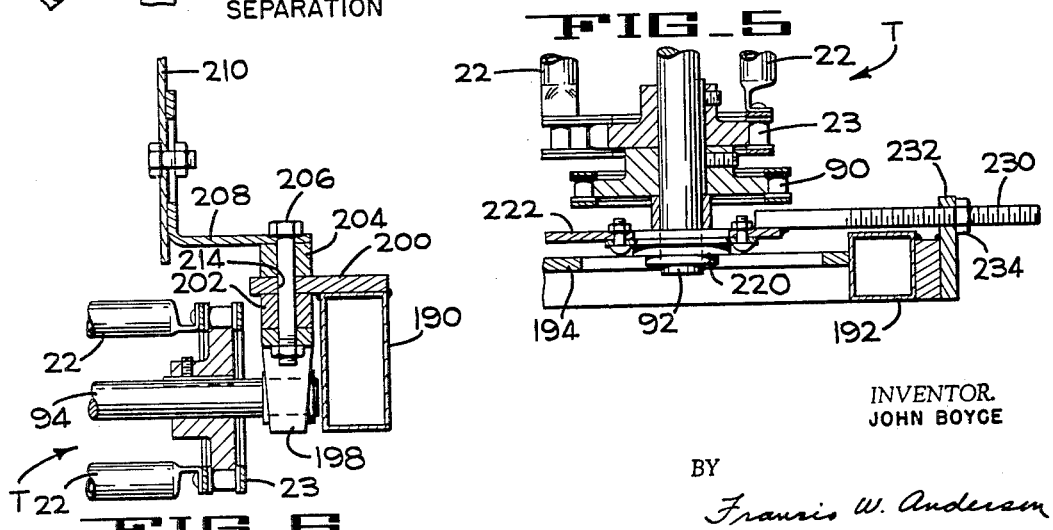
INVENTOR.
JOHN BOYCE
BY
Francis W. Anderson
ATTORNEY Oct. 21, 1969  J. BOYCE  3,473,613
TOMATO HARVESTER
Filed April 26, 1967  5 Sheets-Sheet 4
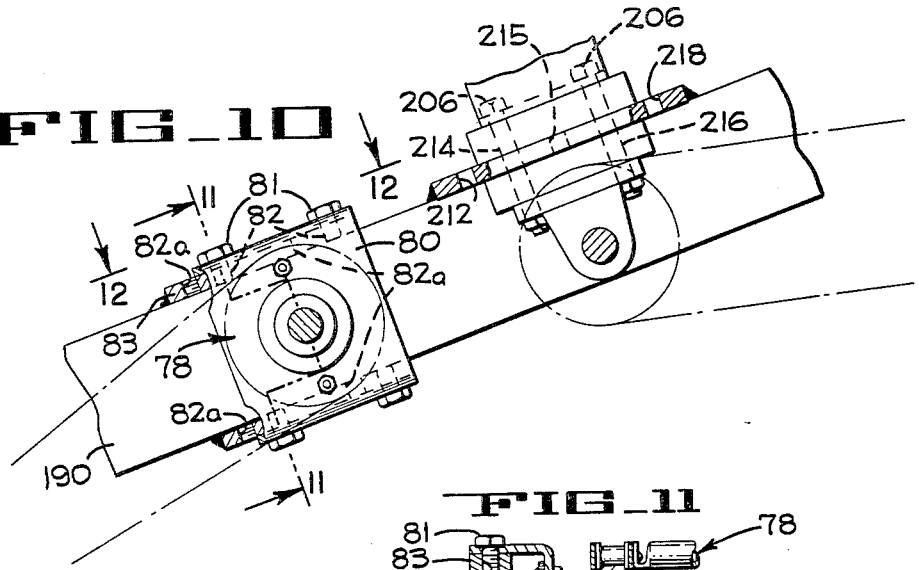
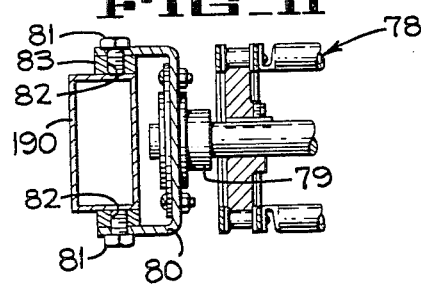
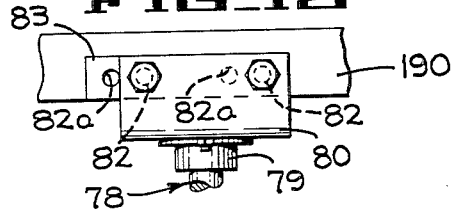
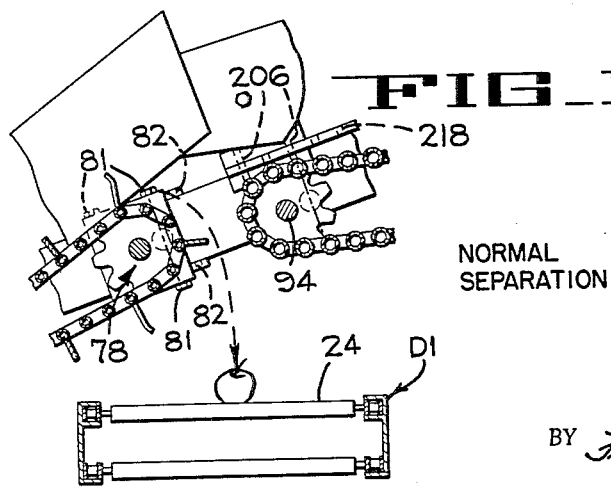
INVENTOR.
JOHN BOYCE
BY Francis W. Anderson
ATTORNEY

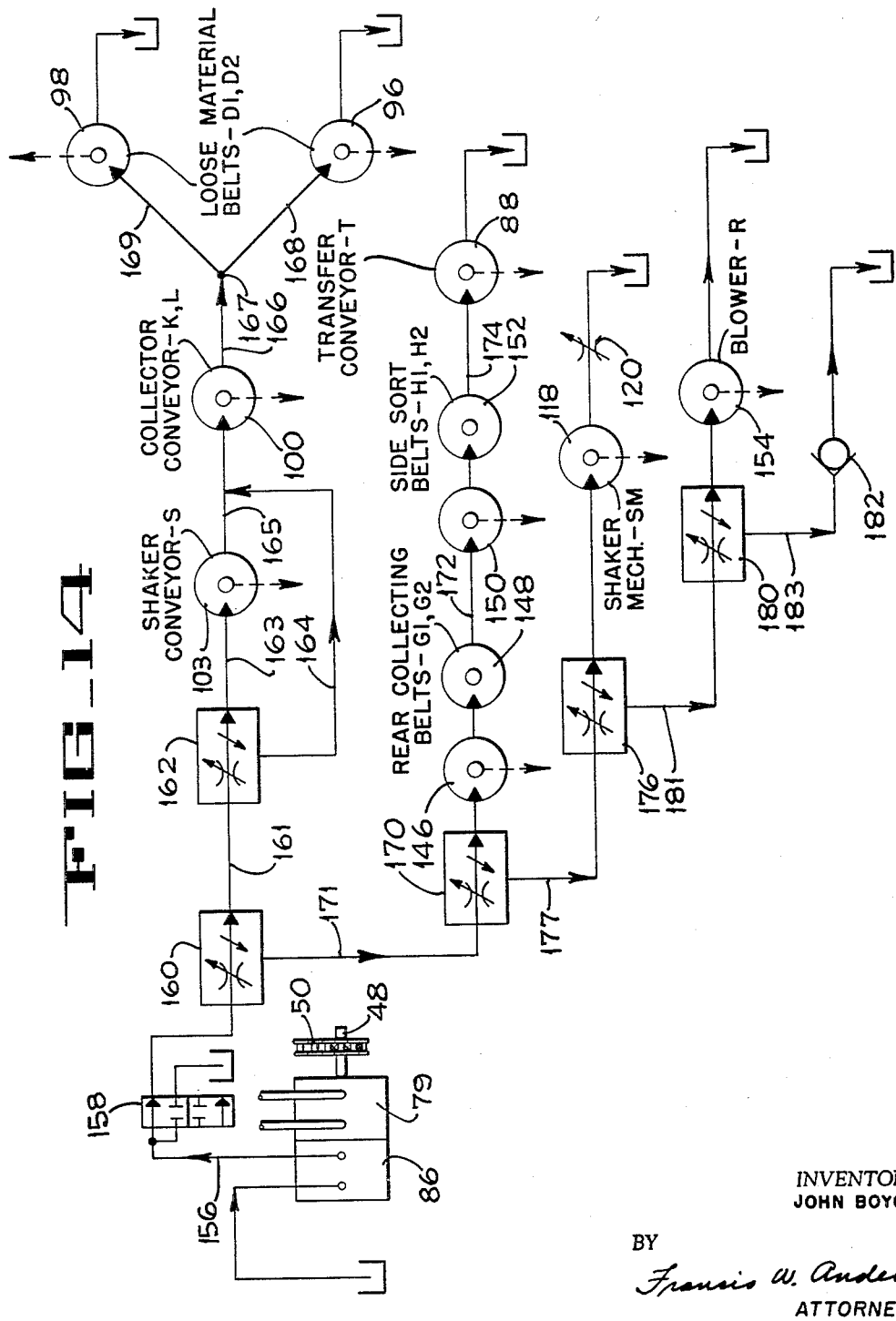

United States Patent Office 3,473,613
Patented Oct. 21, 1969

3,473,613
TOMATO HARVESTER
John Boyce, San Jose, Calif., assignor to FMC Corporation, San Jose, Calif., a corporation of Delaware
Filed Apr. 26, 1967, Ser. No. 633,937
Int. Cl. A01d 55/18, 27/04; B07c 5/12
U.S. Cl. 171—14                                       7 Claims

ABSTRACT OF THE DISCLOSURE

In a tomato harvesting machine, tomato fruit bearing vines are severed and picked up along with loose material, the latter comprising principally loose tomatoes and incidental soil. A feeder conveyor drops the loose material through a gap onto a transversely running loose material conveyor, an endless belt-like transfer conveyor carries the tomato bearing vines onto an endless shaker conveyor. When the ratio of loose to attached tomatoes is high, the transfer conveyor can be adjusted to reduce or even functionally close the loose material gap, and thus reduce the percentage of loose tomatoes that are separated out and hence drop onto the loose material conveyor. The transfer conveyor has a small inclination angle and hence can present smooth surfaces to the tomatoes without roll-back.

BRIEF DESCRIPTION OF THE INVENTION

The tomato harvester of this invention represents an improvement over that described in the patent to Looker et al. 3,301,331, issued Jan. 31, 1967, and in the patent to Csimma 3,340,935, issued Sept. 12, 1967, both assigned to the assignee of the present invention. The general principle of the operation of both the aforesaid machines, and of the improved machine of this application, involves a two-stage separation procedure wherein vines bearing attached tomatoes are cut off and deposited on a feeder conveyor, along with loose tomatoes, loose dirt and clods of dirt. A shaker detaches tomatoes from the vines. In the prior machines, the loose tomatoes and clods are always separated out upstream of the shaker.

The machine illustrated by way of example is of a design most like that of the Csimma machine, and the improvements of this invention can be most fully utilized in that design. Hence, these improvements will be explained with principal reference to the Csimma machine.

In the machine of this invention, clods of dirt and the loose tomatoes may be separated out, but they are dropped off from the end of a discrete feeder conveyor, whereas the vines and attached tomatoes continue on to a discrete shaker conveyor. Sorting operators stationed along the front of the machine inspect the loose tomatoes that have dropped off the feeder conveyor, before the shaking steps, and these sorters transfer the good loose tomatoes to a collecting conveyor for ultimate deposit into a mobile bin. The vines (which bear tomatoes) are transferred onto the shaker conveyor, and these are vigorously shaken to detach the tomatoes from the vines. These detailed tomatoes pass on to side sort conveyors (as in the Csimma machine), whereupon a second set of sorting operators remove the cull detached tomatoes, allowing the good detached tomatoes to pass on and combine with the good loose tomatoes selected by the front sorting operators.

To summarize, in the type operation described above, the front sorting operators must inspect all loose tomatoes, and select the good ones for transfer to a collecting conveyor, whereas the side sorting operators must inspect all detached tomatoes and select the bad ones for culling. This summary applies to the Csimma machine, but not necessarily to the machine of this invention, as will be seen.

In field operating conditions where the ratio of loose tomatoes to attached tomatoes is not too high, that is, where a substantial percentage of the total tomato crop is made up of vine attached tomatoes to be detached by the shaker, the front sorters (who must select the good loose tomatoes and transfer them to a collector conveyor system) can usually keep up with the flow of loose tomatoes through the machine. However, experience with machines of this type in the field has revealed situations wherein the ratio of loose to attached tomatoes is high enough to exceed the sorting ability of the front sorting operators. Correspondingly, the side sorting operators (who must only inspect tomatoes detached by the shaker) are not kept busy. Conditions of this type can arise from a number of causes, such as fields wherein the harvesting is late in the growing cycle and a large percentage of the tomatoes have ripened and fallen from the vines; reharvesting operations; or conditions wherein the tomatoes are very loosely attached to their vines.

Under the present invention, the controlling operator of the harvester, upon observing a high ratio of loose to attached tomatoes, can adjust an independently operated, belt-like transfer conveyor. This conveyor normally transfers vine attached tomatoes from the feeder conveyor to the shaker conveyor, and permits loose tomatoes to fall clear, as described above. This adjustment is performed in a manner which causes some of the loose tomatoes to be transferred from the feeder conveyor over to the transfer conveyor along with the vine mass, and hence onto the shaker conveyor. In fact, the transfer conveyor adjustment can be performed in a manner wherein both vine attached and most of the tomatoes are transferred to the shaker conveyor.

In cases wherein the transfer conveyor only separates out some of the loose tomatoes, and passes some on, then the sorting can be more equally distributed between the front and side sorting operators, as explained.

In cases wherein substantially all the loose tomatoes are carried on to the shaker conveyor, then only side sorting operators need be employed. Since the machine lends itself to the use of more side sorting than front sorting operators, this is a valuable mode of operation under reharvesting and similar conditions. In fact, this feature of the invention makes it possible to provide the growers with a choice of machines, including a relatively simple and economical machine which needs no provisions for front sorters. The transfer conveyor need only be adjusted to separate out only the dirt and extremely small tomatoes.

It is recognized that ideally it is desirable to separate all the loose tomatoes before they reach the shaker to avoid undue handling and bruising of the loose fruit which, in normal field conditions is also the ripest fruit. However, this is not always the case, because the tomatoes vary in ability to withstand handling and secondly, tomatoes can be harvested before they are fully ripe, in which case it may be perfectly satisfactory to separate none and hence pass substantially all the tomatoes, both loose and vine attached, over the shaker. Decisions as to setting up the latter mode of operation can also be affected by the nature of the shaker itself because a shaker that handles the tomatoes gently can be used to accept loose tomatoes without fear of undue damage to to those tomatoes.

The transfer conveyor employed in the present invention to accomplish the aforesaid objectives is in the form of a flexible endless belt-like member made up of closely spliced transverse slats mounted on side chains. The side chains pass over pulleys at the vine receiving and vine discharging ends of the transfer conveyor. These pulleys are mounted so that the transfer conveyor can be moved closer to the delivery end of the feeder conveyor, to decrease the separation, that is, to increase the degree of transfer of loose tomatoes from the feeder conveyor to the transfer conveyor. This is a planned departure from the condition usually considered to be normal operation, wherein substantially all of the loose tomatoes are separated from the stream before they reach the transfer conveyor.

The receiving end of the transfer conveyor of the present invention can also be raised or lowered relative to the delivery end of the feeder conveyor. Lowering of the transfer conveyor increases the transfer effect, that is, increases the percentage of loose tomatoes that are not separated out at the transfer zone, but are carried on over by the transfer conveyor and hence onto the shaker conveyor. The transfer conveyor presents smooth surfaces to the tomatoes, but it is on a shallow incline, so there is little or no roll-back.

The present invention also represents an improvement over the tomato harvesters of both the abandoned Csimma application, and that of the aforesaid patent to Looker et al., 3,301,331, in that motion of the shaker conveyor is located from the feeder conveyors.

BRIEF DESCRIPTION OF THE DRAWINGS

FIGURE 1 is a perspective diagrammatic view of a tomato harvester embodying the present invention.

FIGURE 1A is an enlarged perspective showing the shaker mechanism drive.

FIGURE 2 is a diagrammatic side view showing the major parts of the harvester and their drives.

FIGURE 3 is an enlarged fragmentary side section of the transfer portion of the apparatus, adjusted for normal separation.

FIGURE 4 is a plan view of the delivery end of the transfer conveyor taken on line 4—4 of FIGURE 3, but showing the near side of the transfer conveyor.

FIGURE 5 is a section taken through the near side of the transfer conveyor on line 5—5 of FIGURE 3.

FIGURE 6 is a vertical section taken through one side of the transfer conveyor on line 6—6 of FIGURE 3.

FIGURE 7 is a view of the near side of the transfer conveyor as indicated in line 7—7 of FIGURE 3.

FIGURE 8 is a view similar to that of FIGURE 3, showing the transfer conveyor adjusted for reduced separation of loose and vine attached tomatoes.

FIGURE 9 is a view like that of FIGURE 8, showing the transfer conveyor adjusted for minimum separation.

FIGURE 10 is an enlarged fragmentary scale section of the transfer portion of the apparatus.

FIGURE 11 is a section taken on line 11—11 of FIGURE 10.

FIGURE 12 is a section taken on line 12—12 of FIGURE 10.

FIGURE 13 is a view like FIG. 3 showing another adjustment for normal separation.

FIGURE 14 is a schematic diagram of the hydraulic circuit for driving the various conveyor motors.

GENERAL DESCRIPTION OF THE HARVESTER

The general arrangement of the frame structure, the wheels and their mounting is a construction mounting of the cutting discs and the undulating side delivery belts as well as mechanical drive elements for these parts as well as for the feeder conveyor are all described in detail in the aforesaid Csimma application Patent 3,340,935 and are further described in the copending application of Manfre, Ser. No. 572,827 filed Aug. 15, 1966 and also assigned to the assignee of the present invention. Many of these mechanical details are not critical to the present invention and hence will not be described in detail in this specification. The aforesaid pending applications are incorporated herein by reference for a disclosure of mechanical designs suitable for the construction of a harvester that embodies the present invention.

The basic units of the tomato harvester, insofar as they are critical to the improvement represented by this invention, will now be briefly described, somewhat in the sequence of the flow of the crop through the harvester. As the harvester moves down the field, the pickup assembly A, FIGURES 1 and 2, severs growing vines and picks them up, along with their attached tomatoes, as well as picking up loose tomatoes lying on the ground. The pickup assembly is described in more detail and claimed in the patent to Greedy 3,330,363 and assigned to the assignee of the present invention. It includes a pair of rotating notched cutting wheels 12, which are normally set so that their leading edges scrape along beneath the surface of the ground. The crop thus picked up is advanced rearwardly by a pair of undulating side belts 14 shown in FIGURE 2, it being understood that the details of the pickup mechanism are not critical to the invention.

The mass of vines with attached tomatoes, loose tomatoes, and incidental dirt, is advanced onto a feeder conveyor B which is formed of slats 16 in the form of rods connected at their ends to side chains 17. Some of the rods 16 have projecting flanges 18, FIGURES 1 and 3 and others carry laterally spaced projecting fingers 20. These flanges and fingers assist in conveying the vines and attached tomatoes upwardly as well as preventing the loose tomatoes from rolling back. FIGURE 1 illustrates diagrammatically how the vines V and vine attached tomatoes VT, loose tomatoes LT and clods of dirt D, are all conveyed and elevated by the feeder conveyor B.

The vines V and their attached tomatoes VT are carried over or transferred from the feeder conveyor B to a transfer conveyor T. This is a flexible, belt-like member formed of lateral rods or slats 22 connected to side chains 23. The larger clods of dirt D and most of the loose tomatoes LT are too big to fall between the slats 16 of the feeder conveyor B, although smaller particles of dirt (e.g. loose dirt), and very small tomatoes can fall between these slats and hence will not progress further through the machine. However, the marketable size loose tomatoes LT and the clods D do drop off over the end of the feeder conveyor B, and these fall onto either of two transversely running loose material conveyors D, D1.

The material conveyors D1 and D2 (sometimes referred to as the "dirt belts") are formed of a plurality of slats 24 connected at their ends to side chains 25. These belts represent an important feature of the machine, in that loose tomatoes which are usually the ripest tomatoes are separated out of the stream before the vines and vine attached tomatoes reach the shaking device. This feature is claimed in the aforesaid patent to Looker et al. 3,301,331.

Running laterally across the front of the machine is a combined collector conveyor K and elevator or loading conveyor L. In the present machine, as distinguished from that of the Csimma application, these conveyors are in the form of a single endless conveyor having slats 26 connected to side chains 27. Front sorting platforms E1, E2 are positioned alongside of the loose material belts D1, D2, so that sorting operators SO (whose footprints are indicated in broken lines on the platforms) can stand and inspect the tomatoes dropped onto belts D1, D2. The tomatoes thus inspected will be the loose tomatoes LT and, of course, the clods of dirt D will also be on the dirt belts.

As mentioned, the sorting operators SO select the good loose tomatoes LT and transfer them manually from the dirt belts D1, D2 to the collecting conveyor K, leaving the cull loose tomatoes LT to run off the end of the belts D, D1. It can be seen at this point that if a crop is being harvested which consists of a very large percentage of loose tomatoes LT, as compared to the percentage of vine attached tomatoes VT, then the sorting operators SO on the front platforms, E2 must inspect and handle a majority of the total crop of tomatoes being harvested.

Resuming this description of the flow through the machine, the vines V and the vine attached tomatoes VT are conveyed along the transfer conveyor T and are dropped off onto a shaker conveyor S. This conveyor has relatively widely spaced slats 28, so that vine attached tomatoes VT, shaken from the vines, will fall between the slats. These slats 28 are connected to side chains 29 in the usual manner. A shaker mechanism SM is connected to longitudinally reciprocate the upper reach of the shaker conveyor, as will be described in more detail presently. At this point it will be noted that the shaker conveyor S, and particularly the reciprocating portion thereof, is entirely isolated from all other conveyors so that no vibratory reactions are transmitted back to the tomatoes approaching the shaker conveyor, and hence the shaking operation is isolated in the machine.

Tomatoes VT detached from the vines by the shaker conveyor drop between the slats 28 onto an undershaker conveyor F. This conveyor comprises slats 30 which are spaced more closely than the slats 28 of the shaker conveyor and are connected to side chains 31 in a conventional manner.

The under shaker conveyor F conveys detached tomatoes VT until they drop off the delivery end of that conveyor and fall onto one or the other of a pair of laterally running, rear collecting conveyors G1, G2. These conveyors have relatively closely spaced slats 32 connected to side chains 33, in a conventional manner.

In order to bring the vine attached tomatoes VT into position for inspection by the side culling or sorting operators, longitudinally running side sort collecting conveyors H1, H2 are provided, this construction also being present in the machine of the Csimma application previously mentioned. The side sort conveyors H1, H2 are composed of conventional rubberized fabric belting 34 and run along inside of longitudinal sorting platforms J1, J2. Culling operator, CO whose footprints are indicated on the platforms inspects the detached tomatoes VT, running on the side sorting belts H1, H2 and manually throw off the green or cull tomatoes, leaving the good tomatoes on the side-sort conveyors. These operators can also throw off clods of dirt D, vine fragments, and other trash reaching the side sort conveyors. Thus, the detached tomatoes VT are recombined with the loose tomatoes LT on the collecting conveyor K and are carried via the elevator conveyor section L into bins or trucks as market tomatoes. The vines V are carried up off the end of the shaker conveyor S and are dropped back onto the ground.

As seen in FIGURE 2, a blower R is provided so as to assist in blowing vines and trash clear of the rear collecting conveyor G1, G2, although this blower is not a feature of the present invention.

GENERAL MECHANICAL DETAILS

Before describing in detail the improved association of elements representing the present invention, reference will now be made to the general construction, certain mechanical details, and the operation of a tomato harvesting machine that embodies the invention.

The flow of tomatoes through the machine and the various conveyors, etc. have been described. As previously indicated this is a mobile harvester which is driven through the field, and the machine illustrated has cutters of a type that are particularly adapted to harvest row crops. However, it is to be understood that the machine of the present invention is not limited to use in harvesting row crops, because other type pickup devices suitable for broadcast harvesting can be employed and are contemplated. In the machine illustrated herein as exemplifying a harvester embodying the invention, a pair of rear drive wheels 40 is provided and in typical operation these drive the harvester along the ground at about 70 feet per minute. A more detailed description of a suitable mounting for these wheels is found in the previously mentioned Csimma application. A front steering wheel 42 is also provided, which wheel is mounted on a vertically adjustable mounting frame 43, for selecting the height of the pickup mechanism A above the ground. The details of the front wheel mounting are not critical to the invention, and a suitable design is shown in the aforesaid patent to Greedy 3,330,363.

The notched cutting wheels 12 sever the vines from below the ground and pick up the vines and attached tomatoes. The cutting wheels are mechanically operated at a peripheral speed of approximately 250 feet per minute, in a manner to be briefly mentioned presently. The undulating side belts 14, which assist in conveying the vines and loose tomatoes as they pass onto the feeder conveyor B, are driven by a chain and sprocket gearing, the details of which are not critical to the present invention. The side belts 14 operate at a linear speed of approximately 70 feet per minute, in the example herein given.

FRONT END DRIVES

The front end material handling portions of the harvester, as well as the vehicle itself, are driven by an internal combustion engine 46 having an output shaft 48 which operates a sprocket chain drive 50 and a countershaft 52. A sprocket chain drive 53 turns the driven element of a clutch 54, which clutch can be engaged by a manual lever 56 to cut in the front end mechanism. The clutch 54 has an output shaft 58 which drives through a right angle gear box 60 to turn a sprocket chain drive mechanism 62, and hence a countershaft 64. The latter, through a sprocket chain drive 66 and a right angle gear box 68 drives a sprocket chain drive 70 for operating the shafts of the cutters 12. The gear box 68 also operates a sprocket chain drive 72 for driving the side belts 14, as is fully disclosed in the Csimma application.

FEEDER CONVEYOR

In order to drive the feeder conveyor B, a sprocket chain drive 74 (FIG. 2) is operated from the countershaft 64 which drives the cutters and side belts 14. Drive chain 74 turns a countershaft 75 which mounts conveyor chain drive sprockets 76 that engage the side chains 17 of the conveyor B. The chains are trained around entry and exit sprocket shaft assemblies 77, 78. The exit sprocket shaft assembly can be shifted between forward and rearward positions to facilitate centering of the loose material falling onto the belt 24. Referring to FIGURES 10, 11 and 12, the bearings 79 for sprocket assembly 78 are bolted to brackets 80. These brackets are mounted on the frame rails 190 by capscrews 81 threaded into either pair of tapped holes 82, 82 or 82a, 82a formed in pads 83 welded to the frame rails. One of the pulleys that guides the feeder conveyor chain is an adjustable idler to accommodate this adjustment of the exit sprocket assembly 78. In FIG. 2 the idlers 83 are adjustable, a conventional adjustment mounting for these pulleys, such as that shown in FIGS. 3, 4 and 5 for the transfer conveyor, can be employed. The adjustment increments for the sprocket elements 78 and 94 of the two conveyors are about one inch.

The drives are such that when the harvester is operated along the ground at a linear speed of about 70 feet per minute, the feeder conveyor B will be operated at a linear speed of about 72 feet per minute. This somewhat higher speed of the feeder belt compensates for its inclination and insures that the mass of gathered material will not be crowded on the feeder conveyor.

The drive wheels 40 are also driven from the internal combustion engine 46, but in the harvester illustrated the drive is via a hydraulic system. The details of this drive are not critical to the present invention and it need only be stated that a hydraulic pump 79, operated by the engine shaft 48, is connected to a hydraulic system indicated schematically by two pipes connected to a hydraulic motor 84. Through gearing, not shown, the hydraulic motor turns wheel sprockets 84 which sprockets may be driven through differential gearing, not shown, on their shaft. Sprockets 85, by means of a sprocket chain drive 85a, turn the rear wheels 40 individually.

HYDRAULIC MATERIAL HANDLING DRIVES

The material handling drives now to be described are all operated by hydraulic motors in a hydraulic system illustrated schematically in the diagram of FIGURE 10, which will be referred to in more detail after the drives themselves have been briefly described. It is to be understood at this point that the hydraulic system for driving the various conveyors is not, in and of itself, critical to the invention and conventional hydraulic engineering design is employed. Hence, only enough detail of these drives is presented to provide an understanding of present invention.

As seen in FIGURES 2 and 10, a second hydraulic pump 86 is operated from the engine shaft 48, and supplies oil under pressure for driving the various hydraulic motors to be mentioned. The transfer conveyor T is driven by a hydraulic motor 88 through a chain and sprocket drive 90, which operates a sprocket shaft 92 for driving the side chains 23 of the transfer conveyor. The material receiving end of the transfer conveyor passes around an idler sprocket shaft assembly 94. The transfer conveyor T is operated, in the example being given, at a linear speed of approximately 75 to 80 feet per minute.

The loose material conveyors or dirt belts, D1, D2 are driven directly by hydraulic motors 96, 98 which operate sprockets 99 (FIG. 1) for turning the side chains 25 of these conveyors. The loose material conveyors are driven at a linear speed of approximately 45 feet per minute, in the present example.

The combined collector and tomato delivery conveyors K, L are driven by a hydraulic motor 100 at the delivery end of the conveyor, driving sprockets 101 (FIG. 1) which engage the conveyor side chains 25. The direction of the single conveyor belt element of this combined conveyor is chained by means of idler sprockets 102, FIGURE 1. The collector conveyor is driven at a linear speed of 90 feet per minute, in the example.

The shaker conveyor S is driven by a hydraulic motor 103 (FIG. 2) which motor also supplies the power for the undershaker conveyor F. The motor 103 operates a shaft which mounts a pair of sprockets 104 for driving the side chains 29 of the shaker conveyor. The side chains 29 are directed over an open path that accommodates the undershaker conveyor F beneath the upper reach of the shaker conveyor, and also permits shaking the upper reach of the latter. Thus, the side chains 29 of the shaker conveyor are trained over upper sprockets 106 and 107, which form the idler sprockets for the upper reach. These sprockets can be longitudinally reciprocated in a manner to be briefly described. A set of normally fixed idler sprockets 107–113 is also provided, to provide the necessary path for the shaker conveyor side chain in the machine, as is clear from FIG. 2. The gearing just described operates a shaker conveyor at a speed of approximately 81 feet per minute.

In order to shake the upper reach of the shaker conveyor chains 28, the idler sprockets 106, 107 are supported on upwardly projecting arms 106a, 107a which, in turn, are pivoted on shafts 113a, 108a for the idlers 113, 108 previously mentioned. In order to oscillate the shaker arms 106a, 107a connector links 116 are pivotally connected to the upper chain idler shafts 106b, 107b. A hydraulic shaker motor 118 oscillates the upper reach of the shaker conveyor through a chain and sprocket drive 120, the details of which are shown in FIGURE 1A. The chain of sprocket drive 120 turns a transverse shaker shaft 122, each end of which mounts a crank 124 pivoted at 125 to one end of a shaker rod 126. The other end of each shaker rod 126 has a pivot connection 128 to the associated side link 116. In normal operation, the upper reach of the shaker conveyor will be oscillated at 220 cycles per minute.

As mentioned, the undershaker conveyor F is also driven by the same hydraulic motor 103 that drives the shaker conveyor S. This drive is effected (FIG. 2) by a sprocket chain drive assembly 132 which turns a countershaft 134. Sprockets 135 on the countershaft 134 drive the side chains 31 of the undershaker conveyor F. The side chains conveyor 31 pass over front and rear idler sprockets 136, 138 and auxiliary idler sprockets 140, 142 as clearly seen in FIGURE 2. The undershaker conveyor is driven, in the example herein presented, at a linear speed of approximately 81 feet per minute.

The rear transverse collecting conveyors G1, G2 which receive the tomatoes VT detached from their vines by the shaker and dropped off onto the undershaker conveyor F, are individually driven in opposite directions by hydraulic motors 146, 148 best seen in FIGURE 1. These motors operate sprocket shafts 146a, 148a at the delivery ends of their respective conveyors. The rear collecting conveyors G1, G2 are driven at a linear speed of approximately 142 feet per minute, in the present example of the invention.

The longitudinally running side sort conveyors H1, H2 receive detached tomatoes VT attached along the rear sides of the machine for culling. The side sort conveyors are driven directly by a connection of hydraulic motors 150, 152 (FIG. 1) which operate the associated sprocket shafts at the tomato delivery ends of the conveyors. The motors 150, 152 drive the side sort conveyors at a linear speed of approximately 50 feet per minute.

The blower R is driven directly by a hydraulic motor 154, as shown in FIGURE 2.

HYDRAULIC DRIVE CIRCUIT

Although the details of the hydraulic drive circuit are not critical to the present invention, the circuit employed in the example of the invention being described is illustrated in FIGURE 10, which will be described in sufficient detail so that those skilled in the art may practice the invention. The various hydraulic motors, valves, pumps, etc. utilized in the machine are of standard commercial design and hence need not be described in detail. The symbols of FIG. 10 are those commonly employed in hydraulic circuit design diagrams, and are taken from the "Fluid Power Book" issue of Machine Design, Dec. 12, 1963, Penton Publishing Company, Cleveland, Ohio.

The engine driven pump 86, draws oil from a conventional reservoir, and discharges through a line 156 to a bypass type off-on valve 158, and on an adjustable bypass flow regulator valve 160. The delivery line 161 of this valve delivers oil to a second adjustable bypass flow regulator valve 162. The first valve 160 acts as a flow divider and supplies the requirements of the motor receiving oil from the line 161. The delivery line 163 of the flow regulator valve 162 drives the hydraulic motor 103 for the shaker conveyor S. The bypass outlet line 164 of the valve 162 is connected into the discharge line 165 for the hydraulic shaker motor 103. Thus, any oil circulating through the system in excess of the shaker motor requirements is passed on by the bypass line 164 to the hydraulic motors that follow in this series branch of the circuit.

The discharge line 165 of the shaker motor 103 supplies the hydraulic motor 100 that drives the collector conveyor group K, L. The discharge line 166 of the collector motor leads to a conventional flow divider 167. Oil from the flow divider passes through branch lines 168, 169 to the hydraulic motors 96, 98 for the loose material conveyor belts D1, D2. Oil discharged from the motors 96, 98 is returned to the reservoir, in accordance with conventional practice.

More oil is supplied by the pump 86 than is taken by the shaker conveyor, collector conveyor and loose material belt motors. This excess of oil leaves the bypass line 71 from the first flow regulator valve 160, and enters a bypass flow regulator valve 170 in another branch line. The hydraulic motors 148, 146 of the rear collecting conveyor belts G1, G2 are connected in series and receive oil from the delivery line of the valve 170. The hydraulic motors 150, 152 that drive the side sorting belts H1, H2 are also connected in series, and receive oil from the discharge line 172 of the hydraulic motor 148 for the rear collecting belt G2.

The hydraulic motor 88 for the transfer conveyor T receives oil from the discharge line 174 of the hydraulic side sort motor 152 and discharges into the reservoir.

The hydraulic motor 118 for the shaker mechanism SM forms another branch line. A bypass flow regulator valve 176 receives oil from the bypass line 177 of the valve 170 and the valve 176 delivers oil to the hydraulic motor 118 for the shaker mechanism SM. A bypass valve 178 is used to direct the flow in 177 either to 176 or to the reservoir. The shaker motor 118 discharges through a variable restrictor valve 120, which prevents overrunning of the motor under light or low load conditions. The valve 120 discharges into the reservoir.

The blower R forms the terminal branch line, and its hydraulic motor 154 receives oil from the bypass line 181 of the valve 176. This oil enters a bypass flow regulator valve 180, which discharges into the hydraulic motor 154 for the blower. The motor 154 discharges into the reservoir. In order to prevent overrunning or hunting of the blower, a back pressure valve 182 is connected into the bypass line 183 of the valve 180 and the back pressure valve discharges into the reservoir. This assists in maintaining the blower at a relatively constant speed, in accordance with the conventional hydraulic design.

TRANSFER CONVEYOR

The construction, mounting and operation of the transfer conveyor T, in relation to the feeder conveyor B and a shaker conveyor S, will now be described in detail. The operation of these portions of the harvesting machine constitutes the improvement of the present invention.

Referring to FIGURES 3-9, the harvester includes a pair of longitudinally extending laterally spaced frame elements 190. These elements mount the idler sprocket shaft 94 at the vine receiving end of the transfer conveyor. As seen in FIGURE 3, the transfer conveyor sprocket shaft 94 is disposed somewhat upstream from the sprocket shaft assembly 78 at the delivery end of the feeder conveyor B. In order to mount the rearward or delivery sprocket shaft 92 of the transfer conveyor, utilization is made of vertical frame elements 192, welded to the associated longitudinal elements 190. Also, longitudinally extending strut 194 is welded to the associated frame element 190 at its forward end and to the associated vertical frame element 192 at its rearward end. The struts 194 each support adjustably mounted chain reach support bars 196, best shown in FIGURE 3.

The sprocket shaft 94 at the vine receiving end of the transfer conveyor is mounted in pillow block bearings 198, FIGURE 6. These bearings are suspended from plates 200 projecting inwardly from the top of each frame element 190. Means are provided to adjust the vertical position of the vine receiving sprocket shaft 94, in the form of spacer blocks 202, 204. In FIGURE 6, the spacer block 202 is between the pillow block bearing 198 and the plate 200. The other spacer block 204 is carried as a spare and is above the plate 200. This assembly of spacer blocks, pillow block 198 and the frame plate 200 is clamped together by a bolt 206 which also mounts side bracket plates 208 that adjustably support side plates 210.

As to the vertical adjustment of the vine receiving end of the transfer conveyor, FIGURE 6 shows a mounting position of the shaft 94 with one spacer block (202) below the frame plate 200 and the other spacer block (204) above it. This positioning of the blocks is also shown in the side view of FIGURE 3, and represents what might be considered the normal position of the vine receiving end of the transfer conveyor relative to the delivery end of the feeder conveyor B.

Under operating conditions wherein it is desired to reduce or minimize the separation of loose tomatoes that occurs in the gap between the feeder conveyor B and the transfer conveyor T, the vine receiving end of the transfer conveyor T can be lowered to the position shown in FIGURE 9. Here, both spacer blocks 202, 204 are interposed between the pillow block bearing 198 and the frame plate 200. If desired, both spacer blocks can be placed on top of the plate 200, which will raise the receiving end of the transfer conveyor to its maximum height relative to the delivery end of the feeder conveyor B.

In order to change the horizontal extent or width of the gap between the feeder conveyor B and the transfer conveyor T, the latter can be shifted longitudinally by a simple bolt adjustment. As seen in FIGURE 7, the frame plate 200 has five bolt holes 212, 214, 215, 216 and 218 for receiving the shaft bearing mounting bolts 206. In FIGURE 7, the shaft 94 is centrally positioned with the bolts 206 extending through the bolt holes 214 and 216. Shown in broken lines in FIGURE 7 is a forward position of the shaft, in which case the bolts 206 would extend through the bolt holes 212 and 215. This is the forward position of the transfer conveyor illustrated in FIGURE 9, when the gap between the feeder conveyor and transfer conveyor is minimized for minimum separation of loose tomatoes from the mass of tomatoes being conveyed across the gap.

Whenever the sprocket shaft 94 is moved longitudinally to change the horizontal extent of the gap between the conveyors, the delivery end shaft 92 must be correspondingly shifted. As seen in FIGURES 3, 4, and 5, the shaft 92 is mounted in outboard bearings 220 which are bolted to bearing mounting plates 222, best seen in FIGURE 5. The mounting plates 222 are provided with outwardly projecting top flanges 224, FIG. 4. The flanges 224 are drilled to receive machine screws 226. A plurality of tapped holes 228 are formed in the frame members 194 (FIG. 4) for receiving the machine screws 226. Thus, the plate 222 that mounts the shaft bearing can be positioned longitudinally and secured in any one of a number of selected positions by removing and replacing the machine screws 226. The actual adjustment is conveniently performed by utilizing a threaded adjusting screw 230 which extends through an ear 232 projecting from the vertical frame member 192. The shaft 92 can be initially positioned to align selected bolt holes in flange 224 and member 194 by turning a nut 234.

The transfer conveyor T has a relatively small angle of inclination $a$ to the horizontal, to facilitate conveying of the vines and tomatoes without roll back. The angle $a$, in the form shown, is about 7° for "normal separation" (FIG. 3).

TRANSFER OPERATION

With respect to the operation of the transfer conveyor T, relative to the feeder conveyor B and the shaker conveyor S, and as previously mentioned, FIGURE 3 shows "normal separation" of the loose tomatoes LT from the vine attached tomatoes VT, still connected to their vines V. The loose tomatoes LT fall through the gap between the two conveyors B and T, and the vine attached tomatoes VT are carried over with their vines, onto the transfer conveyor T along with the vines V from which they depend. In the normal separation condition shown in FIGURES 3, substantially all of the loose tomatoes LT will fall through the gap, and hence will reach the sorting operators SO (FIG. 1) for transfer to the collector conveyor K, if they are good loose tomatoes.

Referring again to FIGURE 3 it will be noted that the transfer conveyor T has a relatively small angle of inclination $a$ relative to the horizontal (7° in FIG. 3), so that the slats 22 forming the conveyor can be formed with smooth surfaces. Thus, even though the slats 22 are formed with smooth surfaces, there is no roll back of either the vines and vine attached tomatoes VT or of any loose tomatoes LT which may be transferred over onto the transfer conveyor T under conditions of reduced separation (FIG. 7) or minimum separation (FIG. 9).

It will be noted that the loose tomatoes LT, as they pass through the gap may be partially supported by the flanges 18 projecting along the length of every fourth slat 16 of the feeder conveyor B. As is also seen in FIG. 3, since the slats 23 of the transfer conveyor T are smooth, the loose tomatoes LT freely slip past those slats as the tomatoes fall through the gap. This minimizes damage to the smaller loose tomatoes separated out at the gap.

The spacing along the feeder conveyor B, between the flanges 18 and the fingers 20, which are on slats half way between the flanges 18, is such that there is no crushing of the tomatoes by any projections on the feeder conveyor B and yet vines are readily conveyed up along the feeder conveyor. As mentioned, the slats 22 of the transfer conveyor T are smooth, there are no tomato crushing projections found on those slats so that the handling of the tomatoes as they drop through the gap between the two conveyors is a gentle one.

In the setting of the transfer conveyor T shown in FIGURE 8, a "reduced separation" condition is shown. Here, the percentage of loose tomatoes separated out and dropped onto the loose material conveyors D1, D2, is reduced from the "normal separation" condition shown in FIGURE 3. In FIG. 8, the smaller loose tomatoes LT are shown passing through the gap between the conveyors, whereas larger loose tomatoes LT have been transferred onto the transfer conveyor T. The adjustment of the transfer conveyor T shown in FIG. 8, will be provided when the ratio of loose to attached tomatoes is relatively high, but not high enough so that almost all of the tomatoes being picked up are loose tomatoes.

As previously mentioned, due to the low inclination angle of the transfer conveyor T, the loose tomatoes LT being carried thereon will not roll back and hence will be advanced on and over the end of the transfer conveyor. Experience has shown that when loose tomatoes are transferred across the gap to the transfer conveyor T, they are transferred without objectionable crushing or bruising. This transfer is assisted by the fact that a mass of vines and attached tomatoes is also being conveyed across the gap between the conveyors. Finally, the fact that the feeder conveyor B is traveling at a linear speed of about 72 feet per minute gives the loose tomatoes a trajectory such that the larger are projected on the path necessary for them to be carried on along by the transfer conveyor.

In FIGURE 9, the condition of "minimum separation" of loose tomatoes from the mass is shown. In fact, virtually all of the loose tomatoes LT (large and small) are carried over onto the transfer conveyor T. Here, as previously described, both spacer blocks 202, 204 are mounted between the pillow block bearing 198 and the frame plate 200, thereby lowering the receiving end of the transfer conveyor. This will increase the inclination angle $a$, FIG. 3, to about 8°. Also, the conveyor T has been shifted longitudinally to reduce the gap between the conveyors to a minimum. Substantially, the only material that falls through the gap is loose dirt and small clods, and very small tomatoes as shown in FIGURE 9. This adjustment of the transfer conveyor will be provided when a large percentage of the crop consists of loose tomatoes, that is, when the ratio of loose to attached tomatoes is extremely high. The adjustment shown in FIGURE 9 would make it possible to substantially dispense with the front sorting operators SO standing on platforms E1, E2 (FIGURE 1), if so desired. Under certain crop conditions, this may represent an important economy in operation of the machine.

In FIGURE 13, "normal separation" is provided with the exit sprocket assembly 78 adjusted to its forward position, even tho the entry transfer conveyor shift 94 is in the forward position of FIGURE 8. The cap-screws 81 for the sprocket assembly 78 are now in the tapped holes 82a of the pads 83. This causes the normal trajectory of the loose material to terminate near the midplane of the belts D1, D2.

Regardless of the position of the transfer conveyor T it will be noted that since it is a discrete conveyor, as is the feeder conveyor B, all the shaking action is confined to the shaking conveyor S and there is no feed back of the shaking action to the conveyors that feed the shaker conveyor. Thus, roll back and pre-shaking of loose tomatoes is reduced to a minimum.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same.

I claim:

1. In a mobile machine for harvesting vine crops such as tomatoes or the like, and of the type comprising means for severing and picking up tomato bearing vines, along with loose material such as loose tomatoes and incidental soil, feeder conveyor means for elevating the vines and loose material, transversely running loose material conveyor means for loose material directly from said feeder conveyor means, vine shaker conveyor means for detaching tomatoes from their vines, transfer conveyor means for carrying the vines from said feeder conveyor means to said shaker conveyor means, and tomato collector conveyor means; the improvement wherein said feeder, vine shaker and transfer conveyor means are discrete, endless conveyors, said transfer conveyor means comprising an endless, flexible belt-like member having a vine receiving end spaced from the delivery end of said feeder conveyor means thereby providing a gap for dropping loose material onto said loose material conveyor means, said transfer conveyor means having a vine delivery end disposed above the vine receiving end of said vine shaker conveyor means for transferring vines to the latter, said transfer conveyor means being inclined to the horizontal by a relatively small acute angle.

2. The harvesting machine of claim 1, wherein means are provided for relatively moving the vine receiving end of said transfer conveyor means and the delivery end of said feeder conveyor means for reducing the loose tomato separating effect of said gap and thus increasing the percentage of loose tomatoes transferred to said shaker conveyor means.

3. The harvesting machine of claim 1, wherein means are provided for moving the vine receiving end of said transfer conveyor means toward and away from the delivery end of said feeder conveyor means for motion of said conveyor end, for changing the effective size of said gap.

4. The harvesting machine of claim 3, wherein said means for moving the vine receiving end of the transfer conveyor provides for motion of said conveyor end.

5. The harvesting machine of claim 3, wherein said transfer conveyor means comprises a plurality of smooth, obstruction free, laterally extending slats.

6. The harvesting machine of claim 6, wherein said transfer conveyor means comprises a plurality of smooth, obstruction free, laterally free, laterally extending slats.

7. The harvesting machine of claim 2, wherein separate sorting platforms are provided for sorting loose tomatoes on said loose material conveying means and for sorting detached tomatoes on said collector conveyor means, so that the sorting assignments of operators on said platform can be adjusted to field conditions.

References Cited

UNITED STATES PATENTS

| | | | |
|---|---|---|---|
| 3,203,430 | 8/1965 | Lorenben et al. | 171—28 XR |
| 3,301,331 | 1/1967 | Looker et al. | 171—1 |
| 3,330,363 | 7/1967 | Greedy | 171—1 |
| 3,331,198 | 7/1967 | Hill et al. | 171—14 |
| 3,340,935 | 9/1967 | Csimma | 171—14 |

ANTONIO F. GUIDA, Primary Examiner

U.S. Cl. X.R.

171—18, 27; 130—30; 209—84

PO-1050
(5/69)

UNITED STATES PATENT OFFICE
CERTIFICATE OF CORRECTION

Patent No. 3,473,613      Dated October 21, 1969

Inventor(s) John Boyce

It is certified that error appears in the above-identified patent and that said Letters Patent are hereby corrected as shown below:

Column 3, line 22   change "abandoned" to --aforesaid--.
Column 3, line 23   change "application" to --patent--.
Column 3, line 25   change "located" to --isolated--.
Column 3, line 68   delete --application--.
Column 4, line 46   change "D,D1" to --D1,D2--.
Column 5, line 55   change "conveyor" to --conveyors--.
Column 6, line 58   change "83" to --83a--.
Column 6, line 58   after "2" delete --the--.
Column 7, line 21   change "10" to --14--.
Column 7, line 41   change "25" to --27--.
Column 8, line 12,   after "chains" delete --conveyor--.
Column 8, line 43   change "10" to --14--.
Column 8, line 48   change "10" to --14--.
Column 8, line 58   change "motor" to --motors--.
Column 9, line 4   change "71" to --171--.
Column 9, line 21   change "177" to --171-- and change "176" to --170--.
Column 12, line 8   change "tho" to --though--.

SIGNED AND
SEALED
MAR 2 1971

(SEAL)
Attest:

Edward M. Fletcher, Jr.
Attesting Officer

WILLIAM E. SCHUYLER, JR.
Commissioner of Patents